United States Patent
Morovic et al.

(10) Patent No.: US 10,338,568 B2
(45) Date of Patent: Jul. 2, 2019

(54) DETERMINING HALFTONE SCHEMES

(71) Applicant: Hewlett-Packard Development Company, L.P., Houston, TX (US)

(72) Inventors: Peter Morovic, Sant Cugat del Valles (ES); Jan Morovic, Colchester (GB); Juan Manuel Garcia Reyero Vinas, Sant Cugat (ES)

( * ) Notice: Subject to any disclaimer, the term of this patent is extended or adjusted under 35 U.S.C. 154(b) by 0 days.

(21) Appl. No.: 15/545,709

(22) PCT Filed: Apr. 24, 2015

(86) PCT No.: PCT/EP2015/058919
§ 371 (c)(1),
(2) Date: Jul. 23, 2017

(87) PCT Pub. No.: WO2016/169615
PCT Pub. Date: Oct. 27, 2016

(65) Prior Publication Data
US 2018/0017957 A1  Jan. 18, 2018

(51) Int. Cl.
| | |
|---|---|
| *G05B 19/40* | (2006.01) |
| *G05B 19/4099* | (2006.01) |
| *H04N 1/405* | (2006.01) |
| *B33Y 50/00* | (2015.01) |
| *G06K 15/02* | (2006.01) |

(52) U.S. Cl.
CPC .......... *G05B 19/4099* (2013.01); *B33Y 50/00* (2014.12); *G06K 15/1823* (2013.01); *H04N 1/405* (2013.01); *H04N 1/4052* (2013.01); *G05B 2219/35134* (2013.01); *G05B 2219/35497* (2013.01); *G05B 2219/49007* (2013.01)

(58) Field of Classification Search
None
See application file for complete search history.

(56) References Cited

U.S. PATENT DOCUMENTS 5,260,009 A * 11/1993 Penn .................. H05K 3/125
264/401
5,704,021 A  12/1997 Smith et al.
(Continued)

OTHER PUBLICATIONS

Cho, W., et al "A Dithering Algorithm for Local Composition Control with Three-Dimensional Printing", Massachusetts Inst. of Tech., Design Lab. Memorandum 2001-3 (2002) 26 pgs.
(Continued)

*Primary Examiner* — Thomas C Lee
*Assistant Examiner* — Gary Collins
(74) *Attorney, Agent, or Firm* — HP Inc. Patent Department (57) ABSTRACT

Methods and apparatus of determining a halftone scheme are described. In an example, data representing a three-dimensional object is obtained, the data comprising object model data representing the geometry of the three-dimensional object and object property data representing at least one object property of at least a portion of the object. It is determined if a halftone scheme dependent object property is specified by the object property data and a halftone scheme is determined. Data representing a portion of the object having a halftone scheme dependent object property is associated with a determined halftone scheme.

15 Claims, 3 Drawing Sheets

(56) References Cited

U.S. PATENT DOCUMENTS

| | | | | |
|---|---|---|---|---|
| 5,805,734 | A * | 9/1998 | Ebner | H04N 1/52 358/3.14 |
| 5,949,964 | A | 9/1999 | Clouthier et al. | |
| 6,007,318 | A * | 12/1999 | Russell | B29C 41/12 425/130 |
| 6,015,207 | A | 1/2000 | Winter et al. | |
| 6,178,011 | B1 * | 1/2001 | Lin | G06T 3/403 358/1.9 |
| 6,870,637 | B1 | 3/2005 | Watanabe | |
| 7,589,868 | B2 | 9/2009 | Velde et al. | |
| 8,405,877 | B2 | 3/2013 | Keithley et al. | |
| 2004/0174566 | A1 * | 9/2004 | Akahori | H04N 1/4053 358/2.1 |
| 2005/0030586 | A1 * | 2/2005 | Huang | H04N 1/405 358/2.1 |
| 2006/0087695 | A1 * | 4/2006 | Keithley | H04N 1/40068 358/3.06 |
| 2010/0168890 | A1 * | 7/2010 | Fisher | B33Y 30/00 700/98 |
| 2011/0096364 | A1 | 4/2011 | Morovic et al. | |
| 2014/0052285 | A1 * | 2/2014 | Butcher | B29C 67/0051 700/98 |
| 2014/0312535 | A1 * | 10/2014 | Dikovsky | A61C 13/0019 264/401 |
| 2014/0324204 | A1 * | 10/2014 | Vidimce | B29C 67/0088 700/98 |
| 2015/0224716 | A1 * | 8/2015 | Hemani | B29C 67/0088 700/98 |
| 2017/0013166 | A1 * | 1/2017 | Katsuyama | H04N 1/4052 |
| 2017/0374234 | A1 * | 12/2017 | Leskanic | H04N 1/603 |

OTHER PUBLICATIONS

Zhou, Chi, et al., "Three-Dimensional Digital Halftoning for Layered Manufacturing Based on Droplets", Transactios of NAMRI/SME, vol. 37 (2009), XP055228318, pp. 175-182.

Doubrovski, E.L., et al. "Voxel-based fabrication through material property mapping: A design method for bitmap" Computer-Aided Design 60 (2015) pp. 3-13.

International Search Report and Written Opinion for International Application No. PCT/EP2015/058919 dated Jan. 15, 2016, 16 pages.

Hiller, Jonathan, et al., "Tunable Digital Material Properties for 3D Voxel Printers", Mechanical and Aerospace Engineering Cornell Univ., Sep. 2008, pp. 33-44, XP002694093.

Cho, W., et al., "Local Composition Control in Solid Freeform Fabrication", Oct. 22, 2001, XP055176779, http://www.mit.edu/~tdp/info-flow/publications/DMI-0100194.pdf.

* cited by examiner

DETERMINING HALFTONE SCHEMES

BACKGROUND

Three-dimensional objects generated by an additive manufacturing process may be formed in a layer-by-layer manner. In one example of additive manufacturing, an object is generated in a print apparatus by solidifying portions of layers of build material. In examples, the build material may be in the form of a powder, fluid or sheet material. The intended solidification and/or physical properties may be achieved by printing an agent onto a layer of the build material. Energy may be applied to the layer and the build material on which an agent has been applied may coalesce and solidify upon cooling. In other examples, chemical binding agents may be used to solidify a build material. In other examples, three-dimensional objects may be generated by using extruded plastics or sprayed materials as build materials, which solidify to form an object.

Some print apparatus that generate three-dimensional objects use control data generated from a model of a three-dimensional object. This control data may, for example, specify the locations at which to apply an agent to build material, or where build material itself may be placed, and the amounts to be placed.

BRIEF DESCRIPTION OF DRAWINGS

For a more complete understanding, reference is now made to the following description taken in conjunction with the accompanying drawings in which.

DETAILED DESCRIPTION

Some examples described herein provide an apparatus and a method for representing a three dimensional object and/or for generating control data that may be used to produce a three-dimensional object. Some examples allow arbitrary three-dimensional content with a variety of specified object properties to be processed and used to generate a three-dimensional object. These object properties may comprise, for example, any or any combination of: conductivity, density, porosity, plasticity, hardness, ductility, strength, interlayer strength and/or appearance properties (color, transparency, glossiness, surface texture, etc). In some examples, data representing a three-dimensional object is processed to generate control data to be used in generating the object.

In some examples, a print material coverage representation defines print material data, for example detailing the amount of print materials (such as agent(s)) to be deposited onto a layer of build material, or in some examples, build materials themselves), and, if applicable, their combinations. In some examples, this may be specified as a proportional volume coverage (for example, X % of a region of a layer of build material should have agent Y applied thereto). Such print materials may be related to or selected to provide an object property.

The actual location at which each print material (for example, a drop of an agent) should be applied, as specified in control data, may be determined using halftoning techniques.

Figure 1:
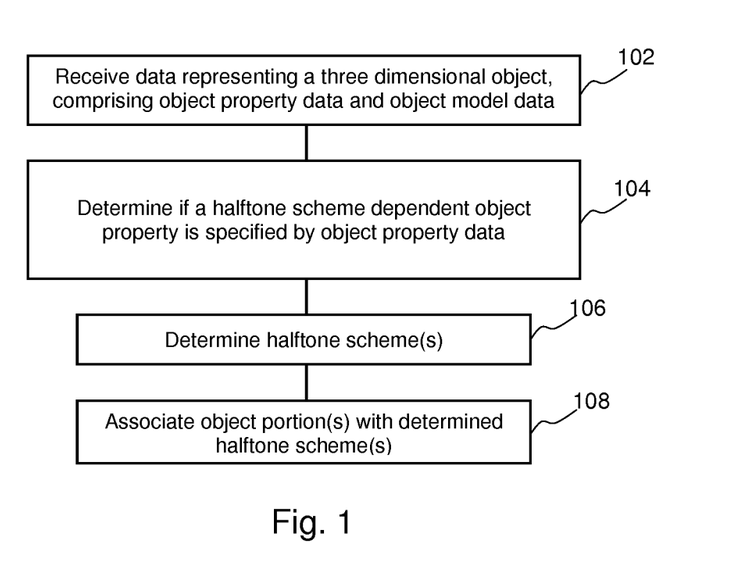
FIG. 1 is a flowchart of an example of associating object model data with a halftone scheme.

FIG. 1 is an example of a method for associating a halftone scheme with data representing a three-dimensional object.

In block 102, data representing a three-dimensional object is received. In examples, the data comprises object model data representing the geometry of the three-dimensional object and object property data representing at least one object property of at least a portion of the object. In particular examples, an array of volumes representing a three-dimensional object is received, in which each volume is located at a unique three-dimensional location and has associated object property data. Such volumes may be the same or different sizes. In some examples, the volumes may be described as 'voxels', i.e. three-dimensional pixels, wherein each voxel occupies a discrete volume, and which volumes may be the same or different size or shape. In data modelling a three-dimensional object, a voxel at a given location may have at least one characteristic represented in object property data. For example, it may have a particular color or may represent a particular material, or have a particular object property, or the like.

The object property data may specify at least one object property such as color, transparency, flexibility, elasticity, rigidity, surface roughness, porosity, conductivity, interlayer strength, density, and the like. In some examples, the received data may be 'rasterized', i.e. converted to series of discrete locations. The rasterized data may be at the printable resolution of the three-dimensional printing apparatus to which control data may be provided.

In block 104, it is determined whether a halftone scheme dependent object property is specified the object property data, i.e. whether reproduction of at least one object property is dependent on selection of an appropriate halftone scheme to generate control data which may be used to generate the object. As used herein, the term 'dependent' includes properties which are sensitive to halftone scheme selection, i.e. any object property which may be enhanced by selection of an appropriate halftone scheme, or diminished by selection of an inappropriate halftone scheme may be deemed to be dependent on selection of a halftone scheme. This may be the case for a range of object properties. For example, if a portion of the object is intended to be conductive, an agent or build material used to produce this portion may be intended to have a connected or continuous structure. Although halftone schemes by their nature tend to result in variable coverage, some halftone schemes are better suited to providing a continuous structure than others. One suitable halftone scheme in such an example may be based on error diffusion. In an example in which the object portion is to have a constant elasticity, a halftone scheme which results in diffuse, well-spread data points (for example, a void-and-cluster halftone scheme) may be used. Another example of an object property which may be dependent on the choice of halftone scheme is weight. For example, a halftone scheme which results in a partially-fused internal structure of an object (e.g. a halftone scheme which applies a coalescing agent to a portion of a layer within the object) may be associated with a lower weight for the final object, as unfused build material may be of a lower weight than fused build material.

In block 106, a halftone scheme is determined. In some examples, if it is determined that there are no object properties which are dependent on the halftone scheme selected, a default scheme may be selected. In some examples, an association between halftone schemes and object properties may be held in a memory, for example as a look-up table, and determination of a particular halftone scheme may comprise selecting a scheme from a memory based on such an association. For example, a cluster-dot scheme may tend to cluster agents closer together, which may in turn result in less agent being used to allow an object to fuse and therefore reduce weight (and/or cost). A void-and-cluster type matrix will distribute agents more evenly, and thus may be of use in reproducing properties intended to be homogenous, such as elasticity or density. An error diffusion technique may be designed to provide a threshold agent density, and therefore enhance connectivity, and therefore may be suitable to reproduce a property which depends on interconnectivity such as conductivity; etc. The halftone schemes may comprise at least one of any of: an error diffusion scheme, a cluster-dot scheme, a dither based scheme, an AM-screen scheme, or the like. There may be more than one scheme of each type, for example designed or intended to enhance reproduction of a particular property or properties.

The selection of an appropriate halftone scheme can therefore at least contribute to, or not detract from, the generation of a three-dimensional object having a predetermined property. Instead of using a poor choice of halftone schemes (which may for example be a single, default, choice), which may result in compensation having to be used later in a process of generating control data (for example, a greater volume of a print material may be specified than could have been specified for a different choice of halftone scheme), consideration of how to achieve the property may be made early in a process to generate control data, and indeed a process to generate an object, which may ease subsequent processing burdens. In addition, in some examples, the selection may be made at least in part automatically, rather than requiring user consideration and input, which may in turn rely on a high level of understanding on the part of the user. Thus the selection of an appropriate halftone scheme for generation of control data for three-dimensional object generation is simplified, in particular in a case where there may be multiple object properties which are dependent on halftone scheme selection.

In block 108, a portion of the object having a halftone scheme dependent object property is associated with a determined halftone scheme. This may, for example, be in the form of a data tag associated with a volume or a location, or a mapping between a volume/location and the halftone scheme, or an entry in a look-up table, or the like.

Figure 2:
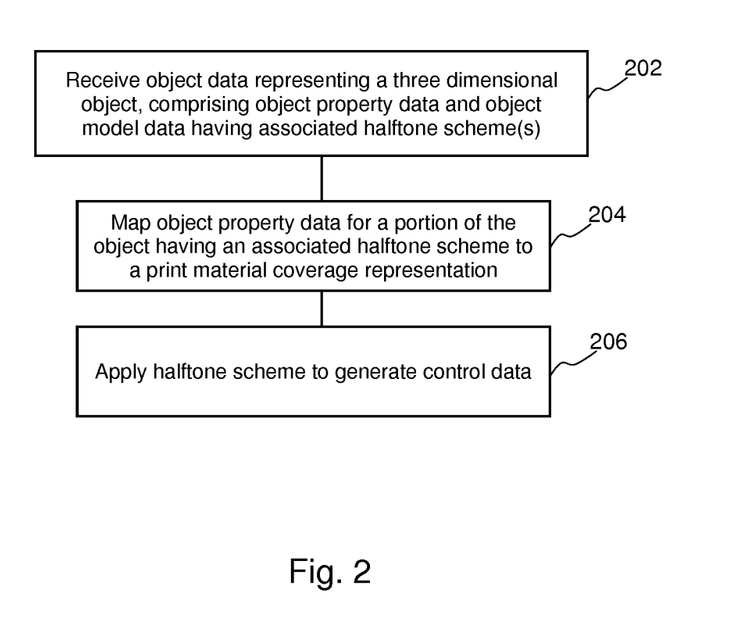
FIG. 2 is a flowchart of an example of a method of generating control data.

FIG. 2 is an example of a method of generating control data. In block 202, object data representing a three-dimensional object is received, the data comprising object property data and object model data having an associated halftone scheme. This may for example comprise data produced by the method of FIG. 1.

In block 204, object property data for a portion of the object having an associated halftone scheme is mapped to a print material coverage representation. For example, a volume such as a voxel may be mapped to associated material volume coverage (Mvoc) vector(s). In a simple case, such a vector may indicate that X % of a given region of three-dimensional space should have a particular agent applied thereto, whereas (100-X) % should be left clear of agent.

Where the choice of halftone scheme has been made bearing in mind an object property, this stage may be simpler than in cases where a particular mapping is to be determined to ensure that the property is seen in an object. For example, if the object property is conductivity, it may be case that, if a poor choice of halftone scheme has been, or could be, made, additional print material such as a conductive agent may be used to obtain the result of an interconnected region of the agent—for example, the volume coverage selected for the mapping may be greater than implied by the object property data to ensure that the agent interconnects within a generated object. This may mean that a specific mapping should be selected and used. However, in this example, a standard mapping is more likely to apply in more cases, as an appropriate halftone scheme has been selected which may tend to enhance or increase interconnectivity. This may ease processing at this stage, provide greater freedom of choice for achieving other object properties and/or make efficient use of materials.

The print material coverage representation may then provide the input for a 'halftoning' process to generate control data that may be used by an additive manufacturing system to produce a three-dimensional object according to the halftone scheme associated with the portion of the object (block 206). In some examples, the halftone scheme may be based on threshold values, for example provided as a halftone threshold matrix. In examples where different object portions are associated with different halftone schemes, the matrix may be a matrix for a single portion, or a composite matrix comprising halftone threshold data generated using multiple halftone schemes, each associated with a region of the matrix which will be applied to an object portion with which that scheme was associated. In other examples, if at least one halftoning scheme is not based on threshold values (for example, being based on error diffusion techniques), then the portions to be processed using such a non-threshold based scheme may be processed according to that scheme and separately from any portions that involve one or a combination of threshold based schemes.

For example, it may be determined that 25% of a layer of build material (or of a portion of a layer) should have an agent applied thereto (i.e. 25% volume coverage is specified). The halftoning process determines where the drops of agent fall in order to provide 25% coverage, for example by comparing each location to a threshold value provided in a halftone threshold matrix.

Figure 3:
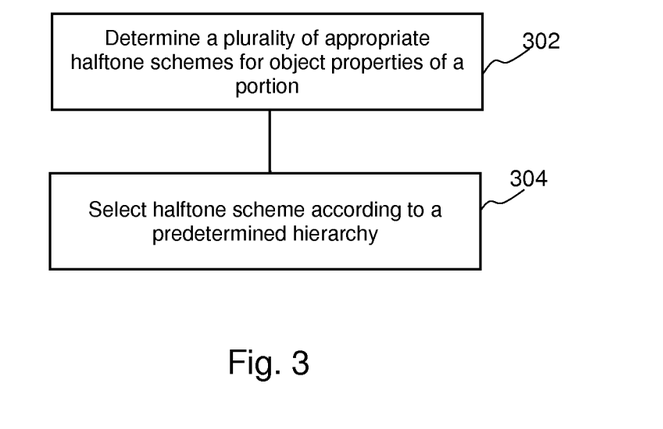
FIG. 3 is a flowchart of an example of a method for selecting a halftone scheme.

FIG. 3 is an example of a method of determining an appropriate halftone scheme. In this example, the object property data associated with an object portion specifies a plurality of object properties which are dependent on selection of a halftone scheme. Indeed, in this example, the object properties are associated with the use of different halftone schemes, and each object property may be associated with a plurality of schemes, each of the schemes being capable of representing the object property with a predetermined effectiveness.

In this example, the method comprises determining, for object properties of an object portion, a plurality (for example all available) appropriate halftone schemes (block 302). This may comprises consulting a look-up table, which may be held in a memory or the like, or may be determined analytically. In some examples, not all object properties will be sensitive to the halftone scheme and these may be ignored or else all available halftone schemes may be returned. In block 304, a halftone scheme is selected according to a predetermined hierarchy. The hierarchy may be between object properties and/or between schemes, which may for example be ranked within a hierarchy for their effectiveness in reproducing a particular property. The selection may comprise weighting the properties according to a position in a property hierarchy to identify the most suitable halftone scheme. This hierarchy may be predetermined stored in a look-up table or may be user defined. A user may for example specify a particular hierarchy for a particular print operation, or may select from a plurality of predetermined hierarchies.

Such a method may allow selection of a halftone scheme which is at least partially effective in representing at least two, and in some examples, all of the object properties. For example, it may be that functional properties, such as conductivity, are given greater weight than other properties such as density. In such an example, it may be that the most appropriate halftone scheme for conductivity (or another property which is high in the hierarchy) which is also appropriate, although perhaps less effective, to provide a property which is lower ranked in the hierarchy, is selected.

In some examples, if there is no appropriate halftone scheme to provide all properties, a notification may be generated. This may therefore allow an identification of possible conflicts between object properties. As this occurs relatively early in a process of producing the control data, it may be helpful to indicate a potentially irresolvable conflict at this point. This may, for example, result in model data being reassessed.

Figure 4:
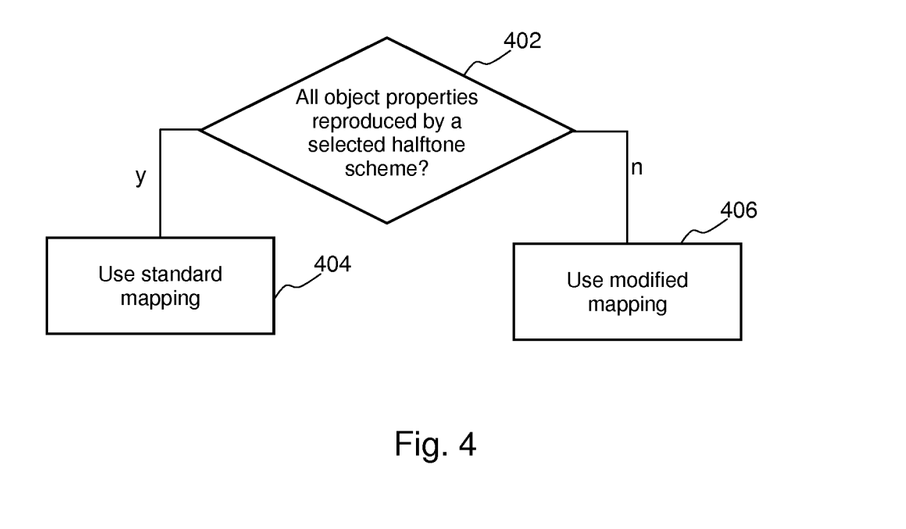
FIG. 4 is a flowchart of an example of a method for selecting a mapping to a print material coverage representation.

An example of a method of mapping to a print material coverage representation is shown in FIG. 4. In this example, the method comprises determining if an object property will be appropriately reproduced by a selected halftone scheme (block 402) and selecting a print material coverage representation according to the determination. If an object property will be appropriately reproduced, a default mapping may be used (block 404). If not, in block 406, a modified mapping is produced in which the volume coverage resulting in the object property is adapted. For example, a particular conductivity may be achieved by ensuring that there is an appropriately linked structure generated by the halftone scheme, as outlined above, but if this has been compromised in consideration of other object properties, it may be that increasing the volume of conductive agent may enhance the conductivity of the object. Therefore, a volume coverage may be determined accordingly. In another example, volume coverage may be increased to achieve a specified elasticity using halftone scheme which results in voids in the application of print material (i.e.at least one region to which print materials may not be applied, which may result in untreated build material, which may in turn remain unfused when an object is generated), as compared with the volume coverage that would be used if a threshold matrix was used that results in a solid volume.

This allows simple mapping to take place in the event that a property is appropriately reproduced by a halftone scheme but also allows for flexibility in the event that not all properties can be adequately represented by consideration of halftone scheme alone for example, if there is more than one property to represent, and the properties indicate conflicting halftone schemes (or differently ranked halftone schemes). In some examples, therefore, the mapping stage provides a second opportunity to achieve an object property if it has not already been achieved by selection of an appropriate halftone scheme.

Figure 5:
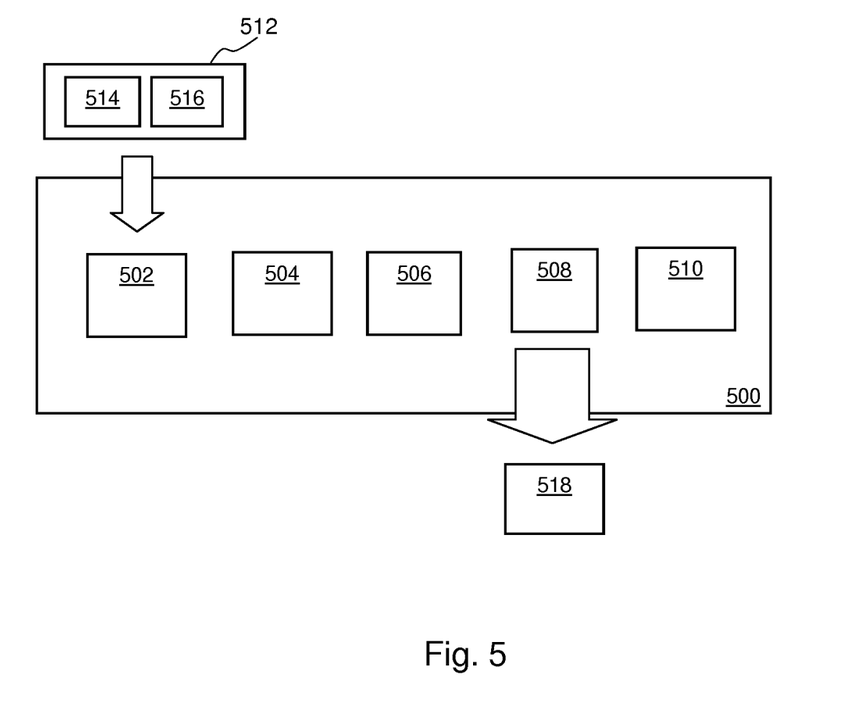
FIG. 5 is a simplified schematic of an example of processing apparatus for generating control data for production of a three-dimensional object.

FIG. 5 shows an example of processing apparatus 500 that may be used to generate control data for production of a three-dimensional object. The apparatus 500 in this example comprises an interface 502, a halftone module 504, a mapping module 506, a control data module 508 and a halftone threshold data generator 510.

In the example of FIG. 5, the data representing a three-dimensional object 512 comprises object model data 514 and object property data 516. The object model data 514 may define the geometry of at least a portion of an object, for example in a three-dimensional co-ordinate system. The object model data 514 may be generated by a computer aided design (CAD) application. Object property data 516 defines at least one object property for the three-dimensional object to be generated. In one case, the object property data 516 may comprise an indication of any of at least one color, flexibility, elasticity, rigidity, surface roughness, porosity, inter-layer strength, density, conductivity and the like for at least a portion of the object to be generated. Object properties may be defined implicitly and/or explicitly.

The interface 502 receives the data 514, 516 representing the three-dimensional object. In some examples, the interface 502 may receive the object model data 514 and the object property data 516 as a single file; in other examples the interface 502 may receive portions of the object model data 514 and/or the object property data 516 as multiple data objects, wherein the object model data 514 and the object property data 516 are distributed across a number of associated data structures. In one example, the object model data 514 may comprise voxels (which may be the same size and form, or comprise voxels of different sizes and form) that are defined in a three-dimensional (also referred to herein as [x,y,z]) space. A given voxel may have associated data that indicates whether a portion of the object is present at that location. The object property data 516 may comprise global and/or local object property data, e.g. certain object property values as defined in the object property data 516 may be associated with each voxel that defines the object and/or certain object property values may be associated with a set of voxels, e.g. ranging from individual voxels to all voxels associated with the object. In one case, the data representing the three-dimensional object comprises a model of a three-dimensional object that has at least one object property specified at every location within the model, e.g. at every [x, y, z] co-ordinate.

In this example, the halftone module 504 analyses the object property data to determine a halftone scheme for generating control data for at least a portion of the object based on the analysis.

In some examples, the halftone module 504 may determine if there is at least one halftone scheme associated with at least a portion of the object. Such an association may have been created for example by the method of FIG. 1. In some examples, the halftone module 504 may determine if the object property data specifies at least one object property reproduction of which is dependent on selection of a halftone scheme, and further determines at least one appropriate halftone scheme. If there is no object property which is dependent on the selection of a halftone scheme (i.e. all object properties may be adequately represented regardless of the halftone scheme selected), a default scheme may be selected.

In some examples, the halftone module 504 may determine if the object property data specifies a plurality of object properties reproduction of which is dependent on selection of a halftone scheme, and determine a halftone scheme which results in control data 518 to reproduce at least one of the object properties according to a predetermined hierarchy. For example, some properties may be weighted above others such that those properties are sure to be reproduced in an object generated by control data 518, which is generated as outlined below.

The mapping module 506 receives the output of the image processor 504 and maps the received data to a print material coverage representation of the three-dimensional object. In one example, the mapping module 506 maps object properties to material volume coverage (Mvoc) vectors. In some examples this mapping may be determined based on a rasterized representation of the three-dimensional object. Parallel planes of a model of the three-dimensional object may be generated which are then rasterized. Each slice may relate to a portion of a respective layer of build material in an additive manufacturing system. In a three-dimensional space that uses a three-coordinate system, e.g. that uses [x, y, z] co-ordinates, these parallel planes may be z-slices, planes that are parallel to x and y axes (or the xy-plane). Each z-slice may comprise portion(s) of a model that have a common z co-ordinates and that extend in the x and y dimensions. The number of z-slices may depend on a resolution of detail in the z dimension and/or the output resolution of a layer of build material(s). Each of these planes may comprise an image such as a bitmap.

The Mvocs may be chosen in light of a pre-determined halftoning scheme and hence may take it into account. Object properties corresponding to an Mvoc may depend on the values stated therein and also on the halftone scheme used to generate control data 518 therefrom. Thus the mapping module 506 may compensate for conflicts resulting from multiple object properties, possibly with conflicting indicated halftone schemes. However, in other cases, as at least some of the object properties will be adequately represented by the halftone scheme selected, the choice of Mvoc may be simpler, as there are fewer variables to consider at this point, and no need to compensate for what may have been a less effective selection of halftone scheme.

An Mvoc vector may have a plurality of values, wherein each value defines a proportion for each, or each combination of print materials in an addressable location of a layer of the three-dimensional object. For example, in an additive manufacturing system with two available print materials (for example, agents) M1 and M2, where each print material may be independently deposited in an addressable area of a layer of the three-dimensional object, there may be $2^2$ (i.e. four) proportions in a given Mvoc vector: a first proportion for M1 without M2; a second proportion for M2 without M1; a third proportion for an over-deposit (i.e. a combination) of M1 and M2, e.g. M2 deposited over M1 or vice versa; and a fourth proportion for an absence of both M1 and M2. In this case an Mvoc vector may be: [M1, M2, M1M2, Z] or with example values [0.2, 0.2, 0.5, 0.1]—i.e. in a given [x, y] location in a z slice, 20% M1 without M2, 20% M2 without M1, 50% M1 and M2 and 10% empty. As each value is a proportion and the set of values represent the available material combinations, the set of values in each vector sum to 1 or 100%.

For example, in a case where the agents are colored, then the Mvoc vector may be determined to generate select agent combinations that generate a match with a supplied object property, e.g. a supplied RGB (Red Green Blue) color value.

The control data module 508 operates on the print material coverage representation (for example comprising at least one Mvoc vector) to apply a halftone scheme determined for that portion to generate control data 518 for generating a three-dimensional object.

In this example, the halftone scheme is applied using threshold data provided by the halftone threshold data generator 510, which generates a composite three-dimensional halftone threshold matrix according to the determined halftone schemes. This matrix is applied to the print material coverage representation.

The control data 518 may be in the form of a set of discrete print material choices for a pixel in a plane, wherein the discrete values across the area of the plane may be representative of proportions set out in the print material coverage representation, and may be suitable for use by a print apparatus to generate a three-dimensional object.

Figure 6:
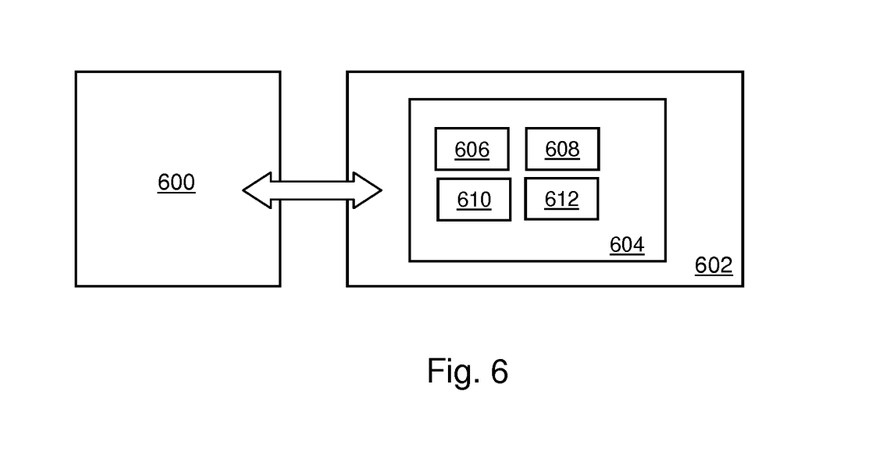
FIG. 6 is an example of example of a processor associated with a memory storing machine readable instructions.

FIG. 6 shows an example of a processor 600 associated with a memory 602. The memory comprises computer readable instructions 604 which are executable by the processor 600. The instructions 604 comprise:

Instructions 606 to determine, for a plurality of object properties specified in data representing a three-dimensional object to be generated by an additive manufacturing print apparatus, if generation of an object property is dependent on use of a particular halftone scheme and, if so, instructions to determined a ranking of the object properties (for example based on the importance of reproduction of the object property);

Instructions 608 to determine if an object property may be generated by more than one halftone scheme, and, if so, to determine a ranking for the halftone schemes based on the effectiveness in generating the object property;

Instructions 610 to select a halftone scheme based on the rankings and object model data indicating at least one object property;

Instructions 612 to associate a selected halftone scheme with object model data. The association may be by way of a data tag, or an entry in a look-up table, or the like.

Examples in the present disclosure can be provided as methods, systems or machine readable instructions, such as any combination of software, hardware, firmware or the like. Such machine readable instructions may be included on a computer readable storage medium (including but not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that each flow and/or block in the flow charts and/or block diagrams, as well as combinations of the flows and/or diagrams in the flow charts and/or block diagrams can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing apparatus, such the processing apparatus 500 or the processor 600, may execute the machine readable instructions. Thus functional modules of the apparatus and devices may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a computer readable storage that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices provide a means for realizing functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It should be noted that the above-mentioned examples illustrate rather than limit what is described herein, and that those skilled in the art will be able to design many alternative implementations without departing from the scope of the appended claims. In particular, a feature or block from one example may be combined with or substituted by a feature/block of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A method comprising:
   obtaining data representing a three-dimensional object, the data comprising object model data representing the geometry of the three-dimensional object and object property data representing at least one object property of at least a portion of the object;
   determining if a halftone scheme dependent object property is specified by the object property data, wherein a halftone scheme dependent object property is an object property the representation of which in an object generated using control data is dependent on selection of an appropriate halftone scheme to generate control data;
   determining a halftone scheme;
   associating data representing a portion of the object having a halftone scheme dependent object property with a determined halftone scheme.

2. A method according to claim 1 further comprising:
   mapping object property data for a portion of the object having an associated halftone scheme to a print material coverage representation specifying print materials for use in generating the object;
   applying the halftone scheme associated with the volume to generate control data for generating the portion.

3. A method according to claim 2 in which mapping to a print material coverage representation comprises determining if an object property will be reproduced by a selected halftone scheme and selecting a print material coverage representation according to the determination.

4. A method according to claim 1 in which determining the halftone scheme comprises selecting from a plurality of halftone schemes.

5. A method according to claim 1 comprising determining that the object property data associated with a portion of the object specifies a plurality of halftone scheme dependent object properties, and, in the event that the halftone scheme dependent object properties are associated with the use of different halftone schemes, selecting a halftone scheme according to a predetermined hierarchy.

6. A method according to claim 1 in which a halftone scheme dependent object property is associated with a plurality of halftone schemes, each of the schemes being capable of representing the object property with a predetermined effectiveness,
   the method comprising determining that object property data of a portion of the object specifies a plurality of halftone scheme dependent object properties, and, in the event that the object properties are associated with the use of different halftone schemes, selecting a halftone scheme which is at least partially effective in representing each of the halftone scheme dependent object properties.

7. A method according to claim 1 in which the halftone scheme comprises at least one of: an error diffusion scheme, a cluster-dot scheme, a void and cluster scheme, a dither based scheme, an AM-screen scheme, a blue-noise scheme, a white-noise scheme.

8. Processing apparatus, comprising:
   an interface to receive data representing a three-dimensional object, the data comprising object model data and object property data;
   a halftone module to analyse the object property data and to determine a halftone scheme for generating control data for at least a portion of the object based on the analysis;
   a mapping module to map the received data to a print material coverage representation relating to object property data of a portion of the object; and
   a control data module to apply halftoning according to the halftoning scheme determined for that portion to the print material coverage representation to generate control data for generating the portion of the three-dimensional object.

9. Processing apparatus according to claim 8 in which the halftone module is to determine a halftone scheme for a plurality of portions of the object based on the analysis.

10. Processing apparatus according to claim 9 comprising a halftone threshold data generator to generate a composite three-dimensional halftone threshold matrix according to the determined halftone schemes and the control data module is to apply the halftone threshold matrix to the print material coverage representation to generate the control data.

11. Processing apparatus according to claim 8 wherein the halftone module is to analyse the object property data to determine if the object property data specifies at least one object property reproduction of which is dependent on selection of an appropriate halftone scheme, and to determine at least one appropriate halftone scheme.

12. Processing apparatus according to claim 8 in which the halftone module is to analyse the object property data to determine if the object property data specifies a plurality of object properties reproduction of which is dependent on selection of an appropriate halftone scheme, and to determine a halftone scheme which results in control data to reproduce at least one of the object properties according to a predetermined hierarchy.

13. A non-transitory computer readable storage medium encoded with instructions, executable by a processor, comprising:

instructions to determine, for a plurality of object properties specified in data representing a three-dimensional object to be generated by an additive manufacturing apparatus, if generation of an object property is dependent on use of a particular halftone scheme and, if so, to determine a ranking of the object properties;

instructions to determine if an object property may be generated by more than one halftone scheme, and, if so, to determine a ranking for the halftone schemes based on their effectiveness in generating the object property.

14. A non-transitory computer readable storage medium according to claim 13 further comprising instructions to select a halftone scheme based on the rankings and object model data indicating at least one object property.

15. A non-transitory computer readable storage medium according to claim 14 further comprising instructions to associate a selected halftone scheme with object model data.

\* \* \* \* \*